US006868119B2

(12) United States Patent  (10) Patent No.: US 6,868,119 B2
Goldstein et al.  (45) Date of Patent: Mar. 15, 2005

(54) POWER SUPPLY TONE COMPENSATION FOR VOICE BAND MODEMS

(75) Inventors: Yurl Goldstein, Southbury, CT (US); Yuri Okunev, Southbury, CT (US)

(73) Assignee: PCTEL, Inc., Milpitas, CA (US)

( * ) Notice: Subject to any disclaimer, the term of this patent is extended or adjusted under 35 U.S.C. 154(b) by 141 days.

(21) Appl. No.: 10/121,348

(22) Filed: Apr. 12, 2002

(65) Prior Publication Data

US 2003/0193998 A1 Oct. 16, 2003

(51) Int. Cl.[7] ............................................. H04L 5/16
(52) U.S. Cl. .................... 375/222; 375/233; 375/350; 455/307; 708/323
(58) Field of Search ..................... 375/222, 229, 375/230, 232, 233, 285, 326, 324, 327, 340, 346, 350; 455/63, 67.1, 67.3, 296, 298, 307, 310; 708/322, 323

(56) References Cited

U.S. PATENT DOCUMENTS

| | | | | |
|---|---|---|---|---|
| 4,926,499 A | * | 5/1990 | Kobayashi et al. | 455/306 |
| 5,084,902 A | * | 1/1992 | Aotani et al. | 375/350 |
| 5,265,151 A | | 11/1993 | Goldstein | 379/97 |
| 5,659,583 A | * | 8/1997 | Lane | 375/346 |
| 6,553,518 B1 | * | 4/2003 | Ware et al. | 714/704 |

OTHER PUBLICATIONS

Article entitled "Timing Recovery for Blind Equalization" by Jablon, Farrow and Chou, AT&T Bell Laboratories, Middletown, NJ, 22ACSSC–12/88/0112, 1988 Maple Press.

Article entitled "Joint Blind Equalization, Carrier recovery, and Timing Recovery for High–Order QAM Signal Constellations" by Neil K. Jablon, IEEE Transactions on Signal Processing, vol. 40, No. 6, Jun. 1992.

Article entitled "Convergence Properties of Optimal Adaptive Carrier Phase Jitter Predictors for Sinusoidal Jitter" by Sugar and Tretter, IEEE Transactions on Communications, vol. 43, No 2/3/4, Feb./Mar./Apr. 1995.

Chapter 12 of the Text Book entitled "Adaptive Signal Processing" by Widrow and Stearns, Prentice–Hall, Inc. Engelwood Cliffs, NJ, 1985.

* cited by examiner

*Primary Examiner*—Dac V. Ha
(74) *Attorney, Agent, or Firm*—Gordon & Jacobson, PC

(57) ABSTRACT

A modem receiver has an equalizer which receives an input signal, an adaptive compensator, and a decision block which generates a decision related to the input signal. A difference between an output of the equalizer and a compensating signal output of the adaptive compensator provides an input for the decision block. A difference between the output of the equalizer and an output of the decision block provides an error estimation signal which is a first input to the adaptive compensator. A difference between the input to the decision block and the output of the decision block provides an error adaptation signal which is a second input to the adaptive compensator.

24 Claims, 6 Drawing Sheets

POWER SUPPLY TONE COMPENSATION FOR VOICE BAND MODEMS

BACKGROUND OF THE INVENTION

1. Field of the Invention

The present invention relates generally to telecommunications. More particularly, the present invention relates to voice band modems which transmit information utilizing signals with low frequency components.

2. State of the Art

Certain types of voice band modems, such as V.90-type and V.92-type modems transmit information utilizing signals with essential contents which include low frequency components (close to DC). In particular, these modems utilize a spectrum which includes the frequency region of power supply tones and their harmonics, which may have significant detrimental effect on modem performance. A very important practical case is when, for information transmission, the modem requires using the same frequencies as the common power supply frequencies of e.g., 50 Hz (Europe) or 60 Hz (USA) and/or their harmonics.

Dealing with this kind of interference is not straightforward. It is not desirable to just filter out the low portion of the spectrum to get rid of the interfering frequencies (hereinafter referred to as "interferers") because the signal itself utilizes the same frequency range.

SUMMARY OF THE INVENTION

It is therefore an object of the invention to provide systems and methods for finding the presence of interfering tones mixed with a signal received by a voice band modem.

It is another object of the invention to provide systems and methods for finding the frequencies of the interfering tones.

It is also an object of the invention to provide systems and methods for compensating for interfering tones mixed with a signal received by a voice band modem.

It is an additional object of the invention to provide modems incorporating systems which compensate for supply frequency interferers without detrimentally effecting modem performance.

In accord with these objects which will be discussed in detail below, the modem of the invention generally includes a receiver and a transmitter with the receiver including an equalizer, an adaptive compensator, and a decision block. An output of the equalizer and an output of the decision block are used to generate an error estimation which is a first input to the adaptive compensator. An output of the adaptive compensator (i.e., a compensating signal) and the output of the equalizer are used to generate an input to the decision block, and the input to the decision block and the output of the decision block are used to generate an error adaptation signal which is used as a second input to the adaptive compensator. The error adaptation signal is also used to update the equalizer.

The adaptive compensator generally includes a means for determining the presence (or lack thereof) of interferers, a means for estimating the frequency of the interferers and for providing reference signals indicative of the interferer frequencies, and an adaptive combiner. When an interferer is present, the adaptive combiner uses the reference signals in conjunction with the error adaptation signal to generate the compensating signal, which, in turn, is used to adjust the equalizer output. When an interferer is not present, the adaptive combiner generates a compensating signal which is zero.

One means for determining the presence of interferers and estimating the frequency of the interferers is to subject the error estimation signal to a Fourier transformation. Another more preferred means is to subject the error estimation signal to a Hilbert Transform and then to utilize a phase lock loop (PLL) to generate the reference signals. The product of the Hilbert Transform output and the reference signals is used to create an input to a phase computation block of the PLL as well as an input to an interferer detector. When the real or imaginary components of the product do not change signs for a long consecutive string of input samples, the presence of an interferer is found; whereas when both the real and imaginary components of the product randomly change sign, a determination is made that there is no interferer.

The systems and methods of the invention can be extended to find frequencies of multiple interferers which may or may not be harmonics of each other.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
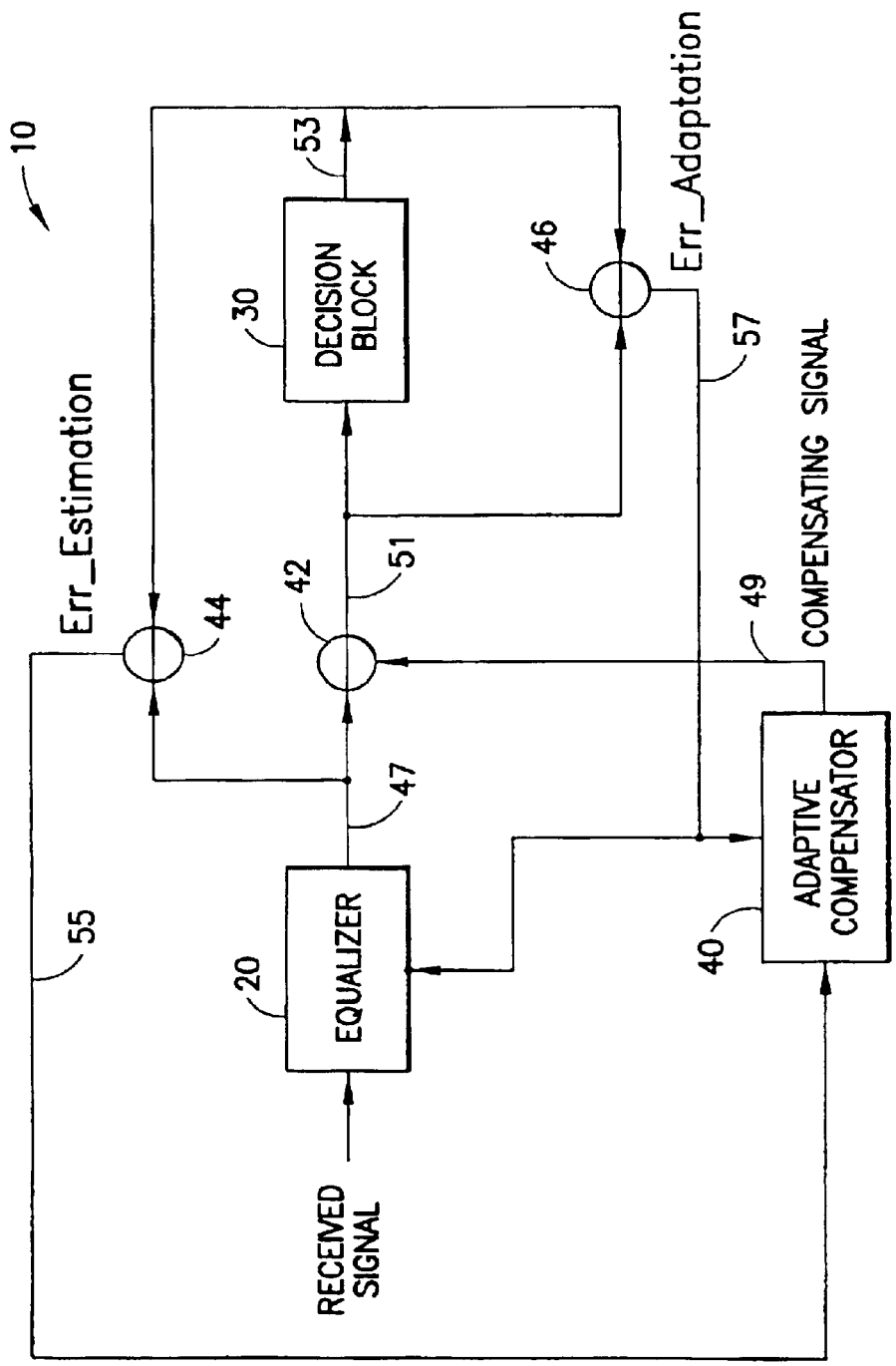
FIG. 1 is a high level block diagram of a tone compensation system according to the invention.

The present invention is implemented in a modem which includes a transmitter (not shown) and a receiver (not shown). According to the invention, the receiver of the modem includes a tone compensation system 10. A high level block diagram of the tone compensation system 10 of the invention is seen in FIG. 1 to include an equalizer 20, a decision block 30, an adaptive compensator 40, and three subtractors 42, 44, 46. The equalizer 20 may be any equalizer known in the art, as the specific structure of the equalizer (e.g., linear, decision feedback, etc.) is irrelevant to the invention. The equalizer receives incoming signals (which have typically been preprocessed by an analog front end, filter, and A/D converter of the receiver), performs equalization, and provides an equalized output 47. The equalized output 47 is corrected at subtractor 42 by a compensating signal 49 (details of which are described hereinafter) and the corrected equalized output 51 is provided to the decision block 30. As with the equalizer, the decision block 30 can be any decision block known in the art, as the specific algorithm for decision-making is irrelevant to the invention. Regardless, the decision block 30 provides at its output 53 a determination (decision) as to what value (e.g., point in a constellation) was sent by the transmitting modem.

According to the invention, the output 53 of the decision block 30 is provided to subtractors 44 and 46 in order to generate two error signals: an error estimation signal 55 and an error adaptation signal 57. The error estimation signal, Err_Estimation, is defined as the difference between the equalizer output 47 before interferer's compensation and the decision block output 51 (or current decision). The error estimation signal 55 is provided as an input to the adaptive compensator 40. The error estimation signal 55 will contain interferers (if present) and provides the least possible level of noise for the compensator 40 (ideally zero noise if the equalizer 20 fully converged). As will be discussed hereinafter, the Err_Estimation signal is used to estimate current interferer's frequencies. The error adaptation signal, Err_Adaptation, is defined as a difference between the corrected equalizer output (i.e., after interferer's compensation) 51 and the decision block output 53. This error should be generated in a modem to control the conventional adaptive equalizer 20. As will be described in more detail hereinafter, the Err_Adaptation signal is an indication of the current interferer's amplitudes and phases and is preferably used by the adaptive compensator 40.

Figure 2:
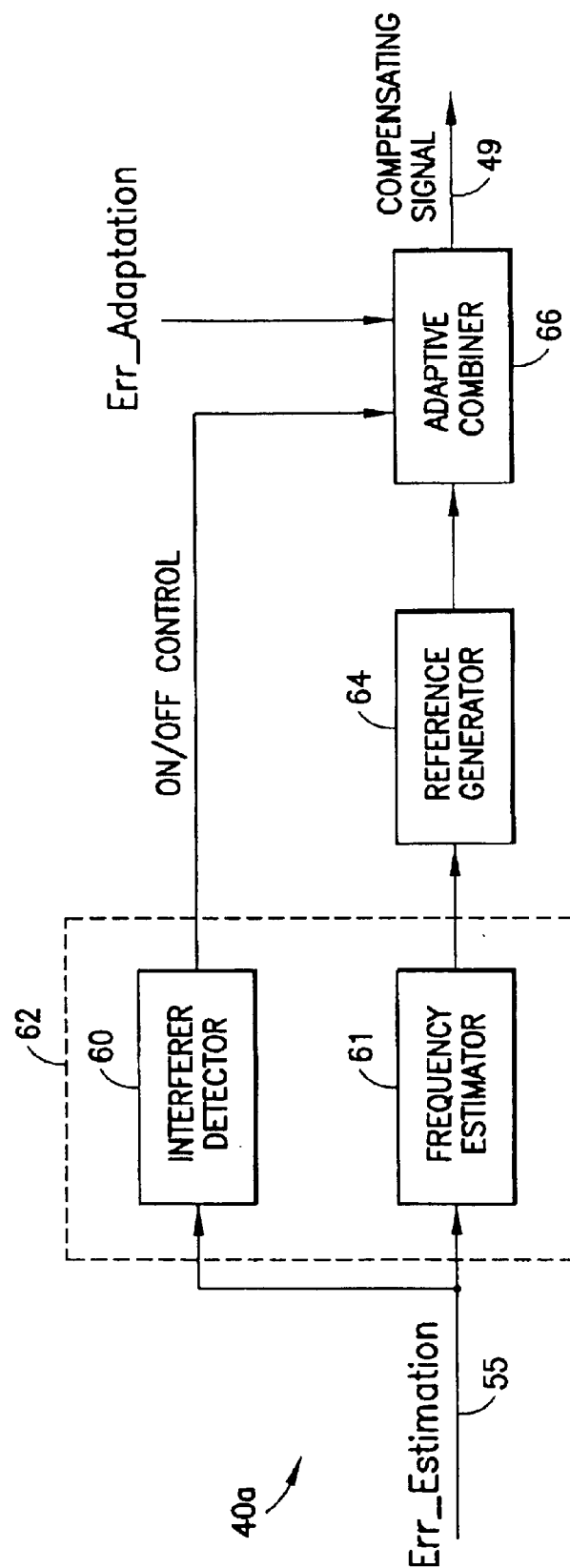
FIG. 2 is a block diagram of a first embodiment of the adaptive compensator of FIG. 1.
Figure 5:
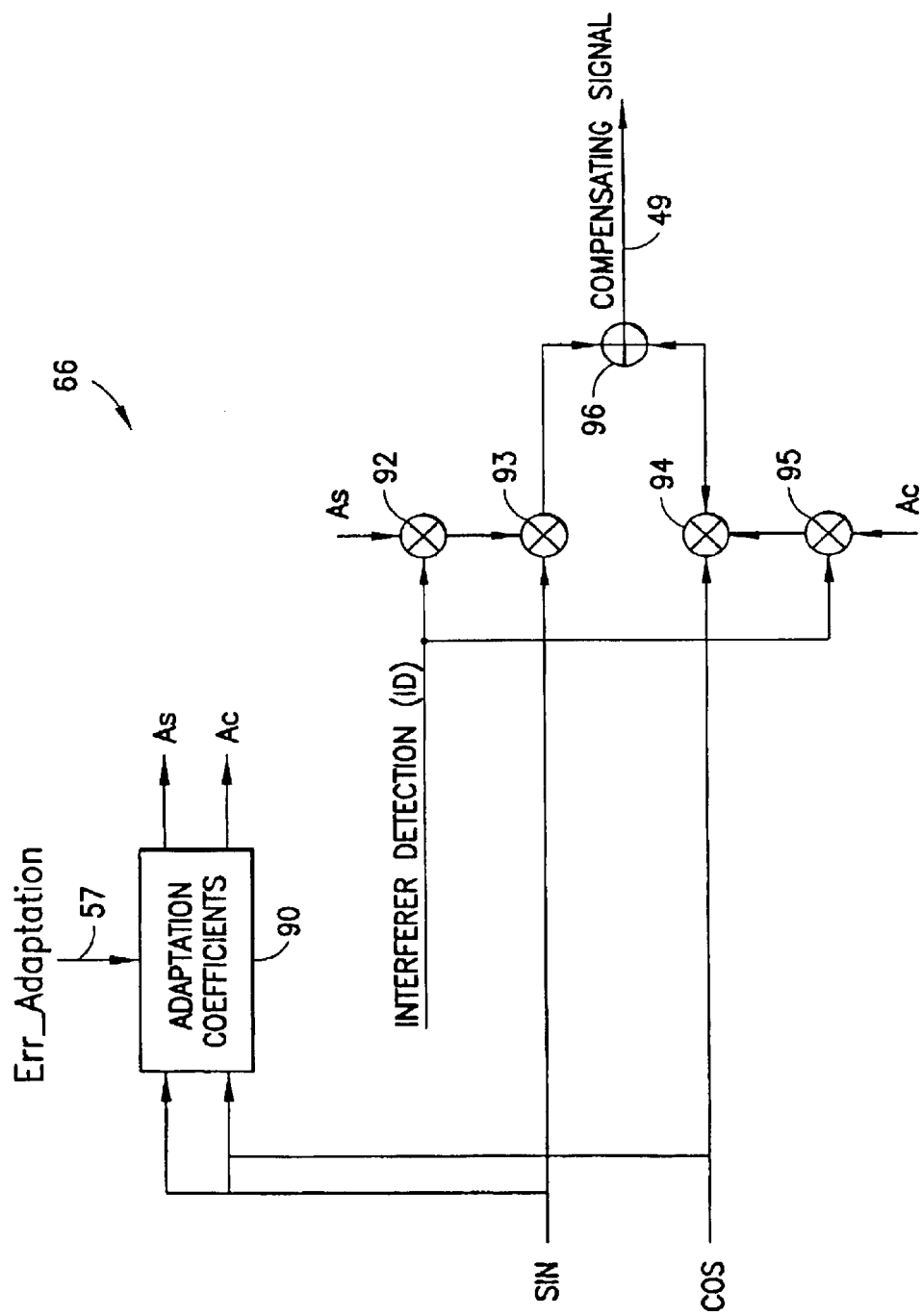
FIG. 5 is a block diagram of the adaptive combiner of FIGS. 2 and 3.

The adaptive compensator 40 of the invention may take various forms. A first embodiment of the adaptive compensator (shown as 40a) is seen in FIG. 2 and includes a interferer detector 60 and interferer frequency estimator 61 which together may be implemented in a Fourier transformer (e.g., a fast Fourier transformer (FFT)) 62, a reference generator 64, and an adaptive combiner 66. More particularly, the Err_Estimation signal is applied to an FFT spectrum analyzer. The FFT result is scanned bin by bin to find a triplet of consecutive bins having combination of values small-large-small. If no such combination of values is find, the detector 60 provides an indication of no interferers present. However, if such a combination is found, the detector 60 provides an indication of the presence of an interferer, and the bin corresponding to the middle of each triplet provides the interferer frequency estimator 61 with an interferer frequency estimation if the power of the bin exceeds some predetermined threshold. The interferer frequency estimation is then converted into sine and cosine signals by the reference generator 64, and the reference sine and cosine signals are provided together with the indication from detector 60 to the adaptive combiner 66. The adaptive combiner, as discussed hereinafter with reference to FIG. 5 provides the compensating signal 49 which corrects the equalizer output.

The adaptive compensator of FIG. 2 is advantageous in that a very wide frequency range and number of interferers can be served. However, discrete frequency estimation requires that in order to achieve fine estimation, a very high resolution of spectrum analysis has to be provided which results in computationally intensive procedure. Thus, an alternate and presently preferred adaptive compensator 40b is seen in FIG. 3.

Figure 3:
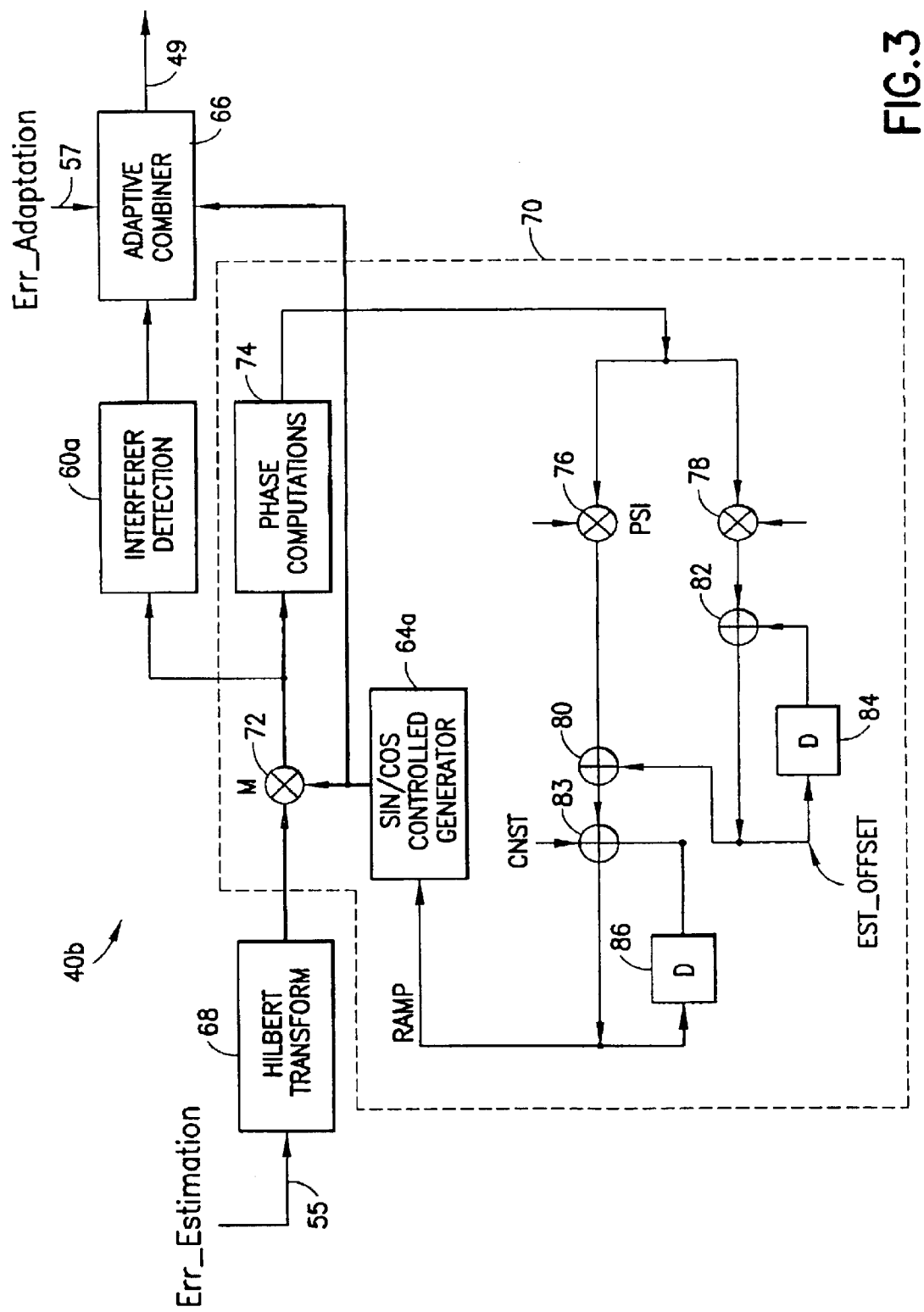
FIG. 3 is a block diagram of a second embodiment of the adaptive compensator of FIG. 1.

Turning to FIG. 3, the adaptive compensator is seen to include a Hilbert transformer 68, a phase lock loop 70, an interferer detector 60a, and the adaptive combiner 66. The phase look loop includes a complex multiplier 72, a phase computation block 74, multipliers 76, 78, adders 80, 82 and 83, delay blocks 84 and 86, and a sine and cosine generator 64a and has the structure of a second order PLL.

A first input into the PLL is a Hilbert transform of the Err_Estimation signal 55, while a second input is a constant CNST (described below in equation (3) with reference to FIG. 6) which corresponds to an initial estimate of the expected interferer frequency (e.g., 50 Hz or 60 Hz, or in the case where either could be present 55 Hz). The output of the Hilbert transform is multiplied at complex multiplier 72 by the sine and cosine of the estimated interferer frequency (i.e., the output of the PLL) and provided to the interferer detection block 60a (described below) and to a phase computation block 74. The phase computation block 74 determines the phase difference between the received vector (i.e., the output of the Hilbert transformer 68) and the PLL output and provides the phase difference to a low pass filter which includes multipliers 76, 78, adders 80, 82, and delay block 84. In particular, the phase difference is multiplied by constants α and β at multipliers 76 and 78 respectively, with the constants being design parameters which define the bandwidth of the PLL. The product of multiplier 78 is fed to adder 82 which adds the product to a previous product value (as the adder sum is fed to delay block 84 which provides that sum to the adder). The sum is then added at adder 80 during the next sample to the product provided by multiplier 76. That sum, in turn is provided to a ramp loop consisting of adder 83 and delay block 86. At adder 83, the sum provided by adder 80 is added to the expected interferer frequency constant CNST and to the previous output value of adder 83 which is provided by the delay block 86. As indicated, the output of adder 83 is provided to the delay block 86 and to the sin/cos controlled generator 64a which automatically generates a reference signal by creating sine and cosine functions of the ramp corresponding to the estimated frequency. The sine and cosine values are provided to the complex multiplier 72 and to the adaptive combiner 66.

Figure 4:
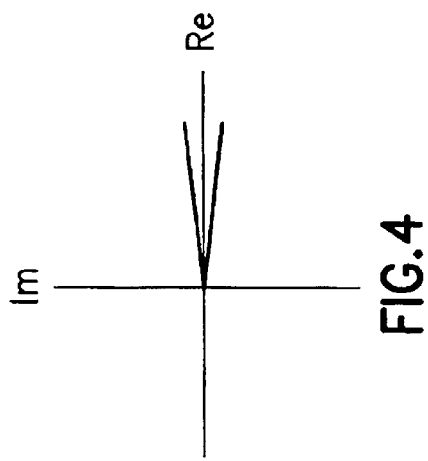
FIG. 4 is a graph illustrating the real and imaginary components of the PLL signal of FIG. 3 in a stable state.

As previously mentioned, the output of the complex multiplier 72 is provided to the interferer detector 60a. In the preferred embodiment, the interferer detector 60a counts a number of consecutive unchanged signs of a component of the output vector, and if this number exceeds a given threshold, the block 60a determines that an interferer is present. In particular, when the PLL converges to some stabilized frequency, real (Re) and imaginary (Im) components of the signal are well localized in a narrow area of a complex plane, as shown in FIG. 4. Thus, the real component Re does not change sign for a long consecutive string of input samples. By defining some threshold (e.g., 100 samples) during which Re component has the same sign, the presence of an interferer can be concluded. On the other hand, if there is no interferer in the Err_Estimation signal, the Re component will have a randomly changing sign. Of course, the same result can be accomplished by designing PLL to have a stabilizing position with the Im component having a stable sign. Regardless, if both the real and imaginary components randomly change sign, no interferer is present.

As previously suggested the interferer detection block 60a sends an interferer detection signal to the adaptive combiner 66. The detection signal is preferably a binary signal; e.g., a 0 if there is no interferer, and a 1 if there is an interferer.

Details of a preferred adaptive combiner 66 are seen in FIG. 5. The adaptive combiner 66 includes an adaptation coefficients block 90, four multipliers 92, 93, 94, 95, and an adder 96. The adaptation coefficients block 90 receives the sine and cosine signals generated by the controlled generator of the PLL and the Err_Adaptation signal 57 (see FIG. 1) and generates adaptation coefficients As(n) and Ac(n) according to the recursive algorithms:

$$As(n)=As(n-1)+Tu*\sin(\text{ramp}(n))*\text{Err\_Adaptation}(n) \quad (1a)$$

$$Ac(n)=Ac(n-1)+Tu*\cos(\text{ramp}(n))*\text{Err\_Adaptation}(n) \quad (1b)$$

where sin(ramp(n)) and cos(ramp(n)) are the controlled generator reference signals from the PLL (see FIG. 3), Tu is a tap update constant, and n is an iteration (sample) number. The adaptation coefficients As and Ac are then combined via multipliers 92, 93, 94, 95 and adder 96 to generate the compensating signal (CS) 49 according to $$CS(n)=ID*\sin(\text{ramp}(n))*As(n)+ID*\cos(\text{ramp}(n))*Ac(n) \quad (2)$$

where ID is the interferer detection signal (equal to 0 when no interferer is present, and equal to 1 when an interferer is present). If the interferer is absent (i.e., no interferer is present) the compensation signal 49 is equal to zero.

The tone compensation system of the invention has been described thus far with reference to single tone (interferer) compensation. In actual many channels, however, power supply interferers may contain several harmonics of the main tone (family of harmonics). In these cases a system for compensating for multiple tones is desirable.

Figure 6:
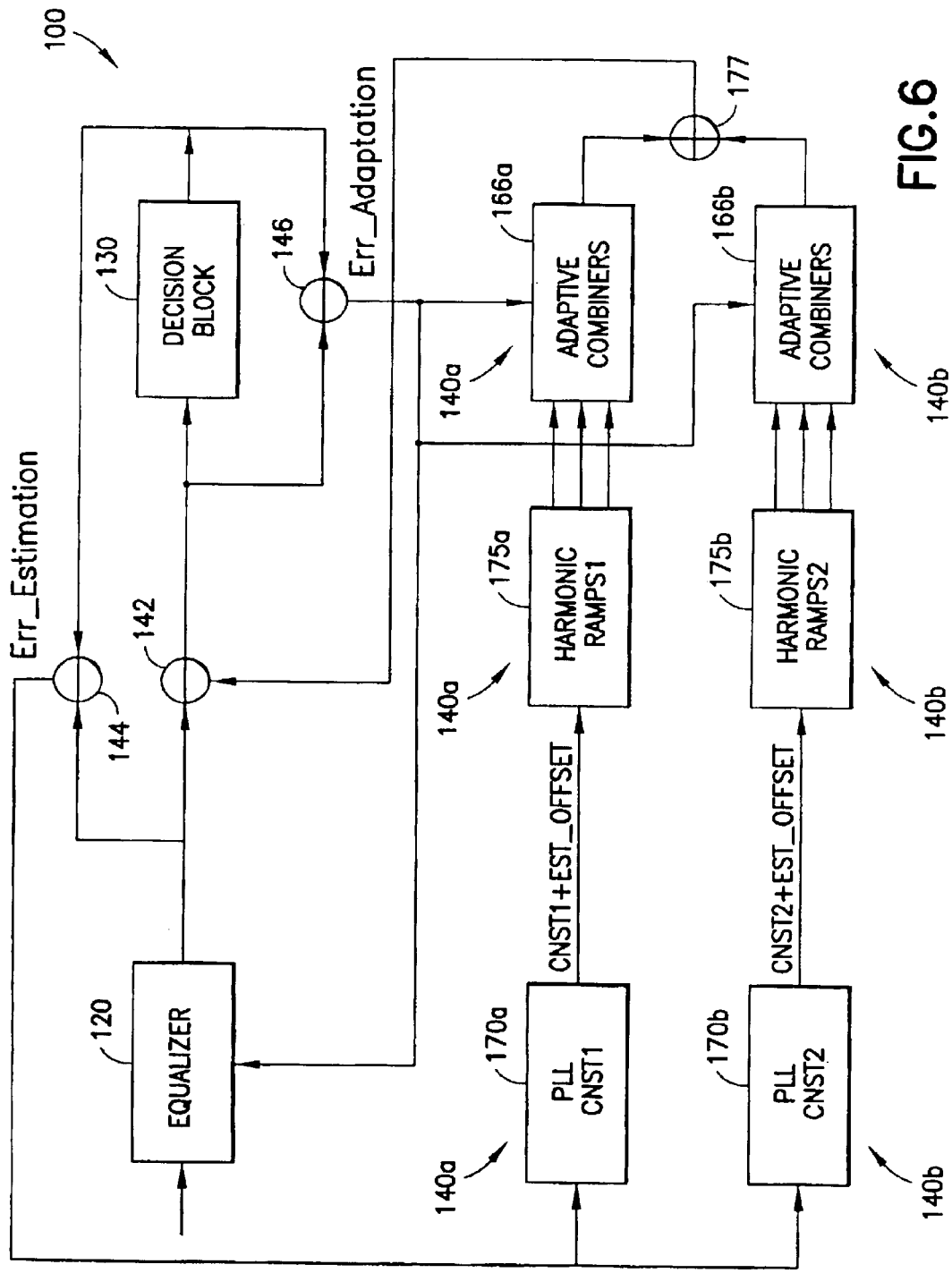
FIG. 6 is a high level block diagram of a multichannel tone compensation system according to the invention.

Turning now to FIG. 6, the system 10 of FIG. 1 is seen to be extended to generate a multitone compensating system 100. System 100 generally assumes that multiple interferers are present which are harmonics of one of two families of frequencies (F1 and F2) approximately known in advance. A very important practical case is when the frequencies represent power supply interferers of F1=50 Hz and F2=60 Hz. As seen in FIG. 6, the system 100 is arranged with an equalizer 120, a decision block 130, and subtractors 142, 144, 146, substantially as in system 10 of FIG. 1 in order to generate the Err_Estimation 155 and Err_Adaptation signals 157. However, the adaptive compensator 140 of FIG. 6 is extended relative to the adaptive compensator 40 of FIG. 1 to include two adaptive compensators 140a and 140b, each of which utilizes a Hilbert transformer/phase lock loop 170a, 170b, a harmonic ramps generator 175a, 175b, and a plurality of adaptive combiners 166a, 166b. The outputs of the adaptive combiners 166a, 166b are added by adder 177 to generate the compensating signal. Each Hilbert transformer/phase lock loop 170a, 170b is substantially as shown in FIG. 3 and each adaptive combiner of each of the plurality of adaptive combiners 166a, 166b is substantially as shown in FIG. 5. The harmonic ramps generator will be discussed hereinafter with reference to FIG. 7.

The compensating system 100 of FIG. 6 functions as follows. The first PLL 170a is initialized with the constant CNST1, corresponding to an average of the expected power supply tones Finit=(F1+F2)/2. The CNST1 is computed as:

$$CNST1=2*(Finit/Fs) \quad (3)$$

where Fs is a sampling frequency (i.e., the frequency of iterations or samples). For each iteration, two kinds of error signals are computed at the output of equalizer 120 and decision blocks 130; namely the Err_Estimation(n) 155 and Err_Adaptation(n) 157. The Err_Estimation signal 155 feeds the PLL 170a which estimates the frequency difference (offset) between the first harmonic of the real interferer (if present) and the initial frequency Finit by adjusting a value corresponding to EST_OFFSET in the loop of FIG. 3 (i.e., the sum resulting from adder 80). Sine and cosine functions of ramp, generated inside the PLL by the sine/cosine controlled generator, are used by a first of the adaptive combiners 166a to generate a first harmonic compensating signal in a manner shown in FIG. 5.

Generation of compensating signals for any other harmonic Ni is accomplished utilizing the harmonic ramps block 175a and additional adaptive combiners 166a. In particular, harmonic ramps block 175a generates a set of independently running ramps generators (one of them is shown in FIG. 7) each initialized with constant CNST_FNi corresponding to the Ni-th harmonic and computed as:

$$CNST\_FNi=(CNST1+EST\_OFFSET)*Ni \quad (4)$$

Figure 7:
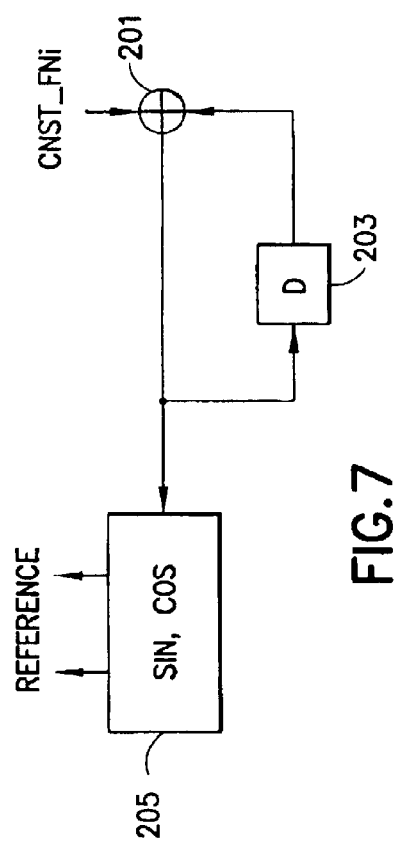
FIG. 7 is a block diagram of a reference signal generator for the harmonic ramps blocks of FIG. 6.

Thus, as shown in FIG. 7, each ramp generator includes an adder 201, a delay block 203, and a sin/cos controlled generator 205. The constant CNST_FNi (generated from values CNST1 and EST_OFFSET from the phase lock loop 170a) is added at adder 201 to its previous value which is provided by the delay block 203. Thus, the output of the adder 201 is provided as an input to delay block 203 as well as to the sin/cos controller generator 205. In this manner ramps for each harmonic desired are generated, and sine and cosine functions of the i-th ramp feeds the i-th adaptive combiner of adaptive combiners 166a to generate an i-th compensating signal under control of the Err_Adaptation signal according to equation (2). The sum of all of the compensation signals are added together and provided to adder 177 to generate the compensating signal which is subtracted from the output of the equalizer 120 before being provided to the decision block 130.

It should be noted that the choice of harmonics to be compensated does not change the essence of the invention and is dictated by the environment in which the invention is used. It should also be noted that the practicality of power supply interferers is such that the first harmonic can be absent. To avoid possible problems with the missing first harmonic, the second (parallel) path with Hilbert transformer/phase lock loop 170b, harmonic ramps block 175b and a set of adaptive combiners 166b are utilized with the expected power supply tones Finit initialized to Finit= F1+F2. If the "first harmonic" path did not detect presence of interferer, it may be switched off, and the detection and estimation (if any) from the "second harmonic" path can be used. Alternatively, the first harmonic path may be left on. Also, if both the first and second harmonic paths detect the presence of an interferer, the second path may be switched off or remain on. Regardless, the constant for initialization of the harmonic ramps 175b is preferably computed as $$CNST\_FNi=(CNST2+EST\_OFFSET)*Ni/2 \quad (5)$$

The harmonic ramps outputs are provided to the adaptive combiners 166b which generate output compensation signals. The sum of all of the compensation signals are added together and provided to adder 177 as described above with reference to adaptive combiners 166a.

It will be appreciated with reference to all of the previously discussed embodiments that the invention will compensate for interferer frequencies even though they are not known exactly in advance. In particular, the provided embodiments quickly estimate interferer frequencies and automatically generate corresponding reference signals which create compensating tones with proper amplitudes, frequencies and initial phases. The compensating system tracks these parameter changes during the session. The provision of a tone compensator in combination with a time domain equalizer provides system robustness in practical situations, taking into account that the power of the interferers as a rule is much lower than signal power.

There have been described and illustrated herein embodiments of modems utilizing power supply tone compensation. While particular embodiments of the invention have been described, it is not intended that the invention be limited thereto, as it is intended that the invention be as broad in scope as the art will allow and that the specification be read likewise. Thus, while a particular phase lock loop utilizing a low pass filter and ramp was shown and described, it will be appreciated that other PLLs could be utilized. Also, while an arrangement for correcting a plurality of tones (e.g., a basic tone and overtones) was described with reference to generating multiple ramps, etc., it will be appreciated that the arrangement utilizing an FFT could also be utilized to identify multiple tones, so that reference generators could generate multiple tones, and adaptive combiners could generate multiple compensating signals for combination into a single compensating signal for the output of the equalizer. It will therefore be appreciated by those skilled in the art that yet other modifications could be made to the provided invention without deviating from its spirit and scope as so claimed.

What is claimed is:

1. A modem, comprising:
a) a transmitter; and
b) a receiver having an equalizer which receives an input signal, an adaptive compensator, and a decision block which generates a decision related to said input signal, a difference between an output of said equalizer and a compensating signal output of said adaptive compensator providing an input to said decision block, a difference between said output of said equalizer and an output of said decision block providing an error estimation signal which is a first input to said adaptive compensator, and a difference between said input to said decision block and said output of said decision block providing an error adaptation signal which is a second input to said adaptive compensator, wherein said adaptive compensator comprises a Fourier transformer which utilizes said error estimation signal to determine whether an interferer is present, and if present, to determine an indication of a frequency of said interferer.

2. A modem according to claim 1, wherein:
said error adaptation signal is provided as feedback to said equalizer.

3. A modem according to claim 1, wherein:
said adaptive compensator further comprises a reference generator which receives said indication of a frequency of said interferer and generates sine and cosine indications of said frequency of said interferer.

4. A modem according to claim 3, wherein:
said adaptive compensator further comprises an adaptive combiner which receives said error adaptation signal, said sine and cosine indications, and an indication from said Fourier transformer as to whether said interferer is present, and generates therefrom said compensating signal output.

5. A modem, comprising:
a) a transmitter; and
b) a receiver having an equalizer which receives an input signal, an adaptive compensator, and a decision block which generates a decision related to said input signal, a difference between an output of said equalizer and a compensating signal output of said adaptive compensator providing an input to said decision block, a difference between said output of said equalizer and an output of said decision block providing an error estimation signal which is a first input to said adaptive compensator, and a difference between said input to said decision block and said output of said decision block providing an error adaptation signal which is a second input to said adaptive compensator, wherein said adaptive compensator comprises a Hilbert transformer, a phase lock loop (PLL) which generates reference signals, a multiplier for obtaining a product of an output of said Hilbert transformer and said reference signals, and an adaptive combiner which generates said compensating signal output, wherein said reference signals are provided as an input to said adaptive combiner.

6. A modem according to claim 5, wherein:
said adaptive compensator further comprises an interferer detector which receives said product and determines therefrom whether an interferer is present.

7. A modem according to claim 6, wherein:
an output of said interferer detector is provided as an input to said adaptive combiner.

8. A modem according to claim 6, wherein:
said interferer detector includes means for determining whether real or imaginary components of multiple samples of said product are of an identical sign.

9. A modem according to claim 8, wherein:
said multiple samples are consecutive samples.

10. A modem according to claim 5, wherein:
said PLL comprises a phase computation means for finding a phase difference between said output of said Hilbert transformer and said reference signals, second and third multipliers for multiplying said phase difference by first and second constants to obtain second and third products, a first adder, a first delay means, and a second adder, said first adder coupled to the third multiplier and also coupled to said first delay means in a feedback loop arrangement with said first adder, said first adder adding a previous sum of said first adder to a present sum of said first adder said second adder adding said present sum of said first adder to the second product.

11. A modem according to claim 10, wherein:
said PLL further comprises at least one harmonic ramp generator and a sine and cosine generator, said harmonic ramp generator including a third adder and a second delay means, said third adder for adding a third constant and a sum of said second adder and a previous sum of said third adder to obtain a present sum of said third adder said present sum of said third adder being provided to said second delay means which is coupled to said third adder in a feedback loop arrangement, and said present sum of said third adder being provided to said sine and cosine generator as a harmonic ramp signal, said sine and cosine generator generating said reference signals.

12. A modem according to claim 11, wherein:
said third constant corresponds to an expected interferer frequency.

13. A modem according to claim 12, wherein:
said expected interferer frequency is chosen from a frequency between substantially 50 Hz and substantially 60 Hz.

14. A modem according to claim 12, wherein:
said expected interferer frequency is chosen as substantially 55 Hz.

15. A modem according to claim 5, wherein:
said PLL comprises at least one harmonic ramp generator and a sine and cosine generator, said at least one harmonic ramp generator including an adder and a delay means, said adder for adding a constant (CNST) to a phase lock loop sum and to a previous phase lock loop sum provided by said delay means to obtain a present sum, said present sum being provided to said sine and cosine generator as a harmonic ramp signal and to said delay means, said sine and cosine generator generating said reference signals.

16. A modem according to claim 15, wherein:
said PLL includes a plurality of harmonic ramp generators, each harmonic ramp generator including a respective adder and a respective delay means, said respective adder for adding a respective constant which is a multiple of said constant (CNST) with a respective sum and a respective previous sum, said sine and cosine generator generating respective reference signals.

17. A modem according to claim 16, wherein:
said adaptive compensator includes a plurality of adaptive combiners, each adaptive combiner receiving said respective reference signals, outputs of said plurality of adaptive combiners generating said compensating signal output.

18. A modem, comprising:
a) a transmitter; and
b) a receiver having an equalizer which receives an input signal, an adaptive compensator, and a decision block which generates a decision related to said input signal, a difference between an output of said equalizer and a compensating signal output of said adaptive compensator providing an input for said decision block, a difference between said output of said equalizer and an output of said decision block providing an error estimation signal which is a first input to said adaptive compensator, and a difference between said input to said decision block and said output of said decision block providing an error adaptation signal which is a second input to said adaptive compensator, wherein
said receiver further includes a second adaptive compensator which receives said error estimation signal and said error adaptation signal as inputs, and provides a second compensating signal output which is used to create said difference which is provided as an input to said decision block.

19. A modem according to claim 18, wherein:
each of said adaptive compensator and said second adaptive compensator comprises a Hilbert transformer, a phase lock loop (PLL) which generates reference signals, a multiplier for obtaining a product of an output of said Hilbert transformer and said reference signals, and at least one adaptive combiner which generates said compensating signal output and said second compensating signal output, wherein said reference signals of said adaptive compensators and said second adaptive compensator are provided as an input to at least one said adaptive combiner of said adaptive compensators and said second adaptive compensator.

20. A modem according to claim 19, wherein:
each PLL of said adaptive compensator and said second adaptive compensator comprises at least one harmonic ramp generator and a sine and cosine generator, each harmonic ramp generator including an adder and a delay means, said adder for adding a constant to a phase lock loop sum and to a previous phase lock loop sum provided by said delay means to obtain a present sum, said present sum being provided to said sine and cosine generator as a harmonic ramp signal and to said delay means, said sine and cosine generator generating said reference signals, wherein respective constants of said adaptive compensator and said second adaptive compensator are different, but related to each other.

21. In a modem having a receiver which has an equalizer which receives an input signal, an adaptive compensator, and a decision block which generates a decision related to said input signal, an improvement comprising:
a difference between an output of said equalizer and a compensating signal output of said adaptive compensator providing an input to said decision block, a difference between said output of said equalizer and an output of said decision block providing an error estimation signal which is a first input to said adaptive compensator, and a difference between said input to said decision block and said output of said decision block providing an error adaptation signal which is a second input to said adaptive compensator, wherein said adaptive compensator comprises a Fourier transformer which utilizes said error estimation signal to determine whether an interferer is present, and if present, to determine an indication of a frequency of said interferer.

22. A method for improving modem performance in a modem having a transmitter and a receiver, the receiver having an equalizer which receives an input signal, an adaptive compensator, and a decision block which generates a decision related to said input signal, comprising:
a) obtaining a first difference between an output of said equalizer and a compensating signal output of said adaptive compensator, and providing said first difference as an input to said decision block;
b) obtaining a second difference between said output of said equalizer and an output of said decision block and providing said second difference as an error estimation signal which is a first input to said adaptive compensator, said adaptive compensator comprising a Fourier transformer which utilizes said error estimation signal to determine whether an interferer is present, and if present, to determine an indication of a frequency of said interferer; and
c) obtaining a third difference between said input to said decision block and said output of said decision block and providing said third difference as an error adaptation signal which is a second input to said adaptive compensator.

23. A method for improving modem performance in a modem having a transmitter and a receiver, the receiver having an equalizer which receives an input signal, an adaptive compensator, and a decision block which generates a decision related to said input signal, comprising:
a) obtaining a first difference between an output of said equalizer and a compensating signal output of said adaptive compensator, and providing said first difference as an input to said decision block;
b) obtaining a second difference between said output of said equalizer and an output of said decision block and providing said second difference as an error estimation signal which is a first input to said adaptive compensator, wherein said adaptive compensator comprises a Hilbert transformer, a phase lock loop (PLL) which generates reference signals, a multiplier for obtaining a product of an output of said Hilbert transformer and said reference signals, and an adaptive combiner which generates said compensating signal output, wherein said reference signals are provided as an input to said adaptive combiner; and
c) obtaining a third difference between said input to said decision block and said output of said decision block and providing said third difference as an error adaptation signal which is a second input to said adaptive compensator.

24. In a modem having a receiver which has an equalizer which receives an input signal, an adaptive compensator, and a decision block which generates a decision related to said input signal, an improvement comprising:

a difference between an output of said equalizer and a compensating signal output of said adaptive compensator providing an input to said decision block, a difference between said output of said equalizer and an output of said decision block providing an error estimation signal which is a first input to said adaptive compensator, and a difference between said input to said decision block and said output of said decision block providing an error adaptation signal which is a second input to said adaptive compensator, wherein said adaptive compensator comprises a Hilbert transformer, a phase lock loop (PLL) which generates reference signals, a multiplier for obtaining a product of an output of said Hilbert transformer and said reference signals, and an adaptive combiner which generates said compensating signal output, wherein said reference signals are provided as an input to said adaptive combiner.

* * * * *

UNITED STATES PATENT AND TRADEMARK OFFICE
CERTIFICATE OF CORRECTION

PATENT NO.         : 6,868,119 B2                                    Page 1 of 1
APPLICATION NO. : 10/121348
DATED              : March 15, 2005
INVENTOR(S)        : Yuri Goldstein et al.

It is certified that error appears in the above-identified patent and that said Letters Patent is hereby corrected as shown below:

Title Page, Item (75)
Inventors,
Change "Yurl Goldstein" to -- Yuri Goldstein --.

Signed and Sealed this

Fifth Day of June, 2007

JON W. DUDAS
*Director of the United States Patent and Trademark Office*